United States Patent
Maffetone

(10) Patent No.: US 9,054,743 B2
(45) Date of Patent: Jun. 9, 2015

(54) AUTO-PAIRING WIRELESS AUDIO/VISUAL SYSTEM

(71) Applicant: ASA Electronics, Inc., Elkhart, IN (US)

(72) Inventor: Gerald J. Maffetone, Granger, IN (US)

(73) Assignee: ASA Electronics, Inc., Elkhart, IN (US)

( * ) Notice: Subject to any disclaimer, the term of this patent is extended or adjusted under 35 U.S.C. 154(b) by 138 days.

(21) Appl. No.: 13/722,708

(22) Filed: Dec. 20, 2012

(65) Prior Publication Data

US 2014/0179228 A1  Jun. 26, 2014

(51) Int. Cl.
| | |
|---|---|
| H04B 7/00 | (2006.01) |
| H04M 1/66 | (2006.01) |
| H04W 4/00 | (2009.01) |
| G06F 21/30 | (2013.01) |
| H04W 12/06 | (2009.01) |

(52) U.S. Cl.
CPC ............... H04B 7/00 (2013.01); *H04W 4/008* (2013.01); *G06F 21/305* (2013.01); *H04W 12/06* (2013.01)

(58) Field of Classification Search
CPC ..... H04W 12/00; H04W 12/06; H04W 12/08; G06F 21/30; G06F 21/305; G06F 3/005
USPC ................ 455/410, 411, 41.1, 41.2, 41.3
See application file for complete search history.

(56) References Cited

U.S. PATENT DOCUMENTS

| | | | | |
|---|---|---|---|---|
| 7,948,367 | B1* | 5/2011 | Arauza ..................... | 340/475 |
| 8,503,929 | B2* | 8/2013 | Ibrahim et al. ............ | 455/41.1 |
| 8,665,332 | B2* | 3/2014 | DePaschoal ............... | 348/148 |
| 2008/0095086 | A1* | 4/2008 | Linkola et al. ............ | 370/310 |
| 2008/0161050 | A1* | 7/2008 | Shudark et al. ............ | 455/558 |
| 2009/0096573 | A1* | 4/2009 | Graessley .................. | 340/5.8 |
| 2010/0115279 | A1* | 5/2010 | Frikart et al. .............. | 713/171 |
| 2010/0130131 | A1* | 5/2010 | Ha et al. ................... | 455/41.3 |
| 2010/0235621 | A1* | 9/2010 | Winkler et al. ............ | 713/153 |
| 2010/0318795 | A1* | 12/2010 | Haddad et al. ............. | 713/168 |
| 2011/0028091 | A1* | 2/2011 | Higgins et al. ............ | 455/41.2 |
| 2011/0215921 | A1* | 9/2011 | Ben Ayed et al. ........ | 340/539.11 |
| 2012/0198531 | A1* | 8/2012 | Ort et al. ................... | 726/7 |
| 2013/0029596 | A1* | 1/2013 | Preston et al. ............. | 455/41.1 |
| 2013/0210412 | A1* | 8/2013 | Larson et al. .............. | 455/418 |
| 2013/0225127 | A1* | 8/2013 | Cavacuiti et al. .......... | 455/411 |

FOREIGN PATENT DOCUMENTS

KR   809244 B1 *  2/2008  ............. B60R 1/08

* cited by examiner

*Primary Examiner* — Duc M Nguyen
(74) *Attorney, Agent, or Firm* — Taylor IP, P.C.

(57) ABSTRACT

A method of auto-pairing a receiver/transmitter system for use with a vehicle having an operator portion and a transporting portion, the method including the steps of initiating, searching and sending. The initiating step initiates the transmitter into a pairing mode by way of an electrical power sequencing of the transmitter. The searching step searches for the transmitter to be in the pairing mode by the receiver. The sending step sends a signal to the transmitter that the transmitter is paired to the receiver upon the receiver finding the transmitter to be in the pairing mode in the searching step.

13 Claims, 3 Drawing Sheets

AUTO-PAIRING WIRELESS AUDIO/VISUAL SYSTEM

BACKGROUND OF THE INVENTION

1. Field of the Invention

The present invention relates to audio/visual systems, and, more particularly, to the pairing of camera/monitor systems used in a vehicular environment.

2. Description of the Related Art

In the vehicle industry, it is known to have electronic devices that are connected with devices built into the vehicle. For years electrical connectors have been provided or wired into the audio system in the vehicle to allow portable user devices to be plugged in so that the audio from the device can be played through the vehicular audio system. The connecting thereof, of course requiring a manual connection of wiring.

Wireless connections have been developed to allow for the wireless interconnection of the devices. For example, an audio system in the vehicle may be paired to an audio type device so that audio can be played through the speaker system of the vehicle. The wireless connecting of the audio device can, for example, take place by way of Bluetooth® technology, where the devices are coupled in a synchronized fashion using spread-spectrum radio frequency techniques. The devices are manually initiated to pair and the algorithms of the two devices synchronize and communicate with each other conveying information to each other to thereby pair them together.

As way of a typical example, here is the sequence of pairing two devices from an instruction booklet:
(1) Make sure the transmitter is off, otherwise switch it off.
(2) Keep the transmitter within 1 meter of the receiver.
(3) Switch on the receiver and enable the pairing mode.
(4) Press and hold the pairing button on the transmitter for approximately 5-7 seconds and do not release it until the red and blue LEDs flash alternately. The transmitter has entered pairing mode.
(5) The transmitter will search for the receiver and finish the connection.
(6) Once connected, the blue LED of the transmitter will flash twice every 4 seconds.
Note: The pairing mode will last 2 minutes. The transmitter will enter a standby mode if no device is connected within the 2 minutes.

As can be seen in the foregoing the operator has to initiate the pairing mode on the receiver by selecting the pairing mode, and then the operator has to initiate the pairing of the transmitter by pressing a button on the transmitter, all within a proximate locale and proximate time period. If this is done infrequently and the devices are often proximate to each other for easy operator access this is not too burdensome. However, when the devices are not easy to place proximate to each other and/or they are not convenient to access to initiate the pairing process then it becomes burdensome to pair the devices.

Regarding a video monitor and camera pairing for a vehicle, if the monitor and camera are paired, then they are mounted on a vehicle then the devices may work together as long as connected to the vehicle. However, if the camera is say mounted on a trailer and the monitor is mounted in a truck cab and a variety of trailers are routinely coupled and decoupled from the truck, the foregoing pairing sequence is burdensome and the safety potential of such a system may not be realized because the pairing regime may be ignored due to its burdensome nature.

What is needed in the art is an efficient camera/monitor pairing system that will pair a receiver and transmitter together in an efficient non-burdensome manner.

SUMMARY OF THE INVENTION

The present invention provides a pairing method and apparatus for the efficient pairing of audio/visual communicating devices, particularly associated with camera/monitor systems of vehicles having trailers.

The present invention in one form is directed to a vehicle system including an operator portion of the vehicle system and a transporting portion of the vehicle system coupled with the operator portion. A receiver is mounted in the operator portion and a transmitter is mounted on the transporting portion. The receiver and the transmitter are configured to become communicatively coupled by way of an auto-pairing method having the steps of initiating, searching and sending. The initiating step initiates the transmitter into a pairing mode by way of an electrical power sequencing of the transmitter. The searching step searches for the transmitter to be in the pairing mode by the receiver. The sending step sends a signal to the transmitter that the transmitter is paired to the receiver upon the receiver finding the transmitter to be in the pairing mode in the searching step.

The present invention in yet another form is directed to a method of auto-pairing a receiver/transmitter system for use with a vehicle having an operator portion and a transporting portion, the method including the steps of initiating, searching and sending. The initiating step initiates the transmitter into a pairing mode by way of an electrical power sequencing of the transmitter. The searching step searches for the transmitter to be in the pairing mode by the receiver. The sending step sends a signal to the transmitter that the transmitter is paired to the receiver upon the receiver finding the transmitter to be in the pairing mode in the searching step.

An advantage of the present invention is that it the pairing of a video camera mounted on the back of a trailer can be paired to a receiver/monitor in the cab of the truck, by a truck operator without leaving the truck.

Another advantage of the present invention is that it provides a way of placing the camera transmitter into a pairing mode using the power feed wire to the camera/transmitter.

Yet another advantage of the present invention is that the power sequencing step is easily initiated by the operator.

Yet another advantage of the present invention is that the electrical power sequencing can be automated.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
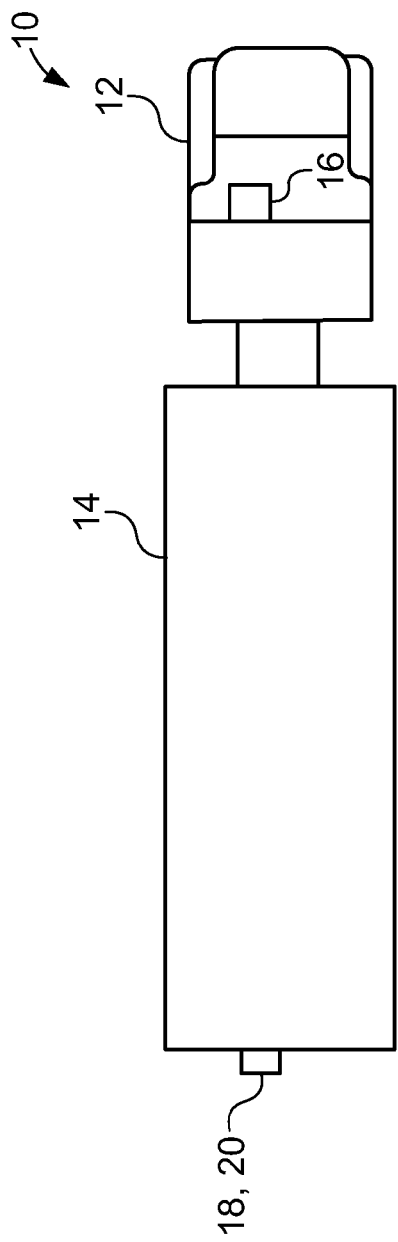
FIG. 1 is a schematical top view of a vehicle system using an embodiment of the pairing method of the present invention.
Figure 2:
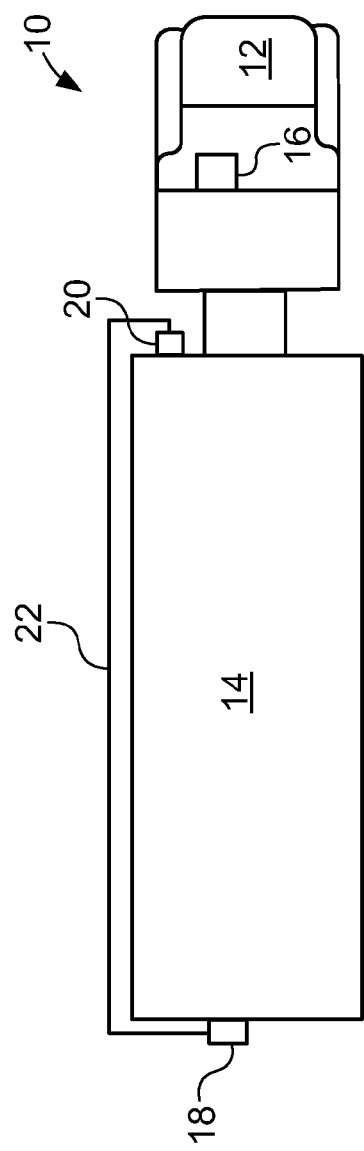
FIG. 2 is another schematical top view of the vehicle system of FIG. 1 using another embodiment of the present invention.

Referring now to the drawings, and more particularly to FIGS. 1 and 2, there is shown a vehicle system 10 having an operator portion 12 and a transporting portion 14. Operator portion 12 may be a truck 12 or semi-truck tractor 12, and transporting portion 14 a trailer 14. Trailer 14 is detachably connected to truck 12. Connected to an interior portion of truck 12 is a receiver 16 in the form of an audio visual monitor 16. Connected to the back of trailer 14 is a camera 18 that is connected to a transmitter 20. Transmitter 20 may be integral with camera 18 as illustrated in FIG. 1, or transmitter 20 and camera 18 may be separated as shown in FIG. 2 with a link 22 connecting them. Link 22 may be for communications only and may be a wired link or a wireless connection. Link 22 may also connect electrical power between transmitter 18 and camera 20.

Figure 3:
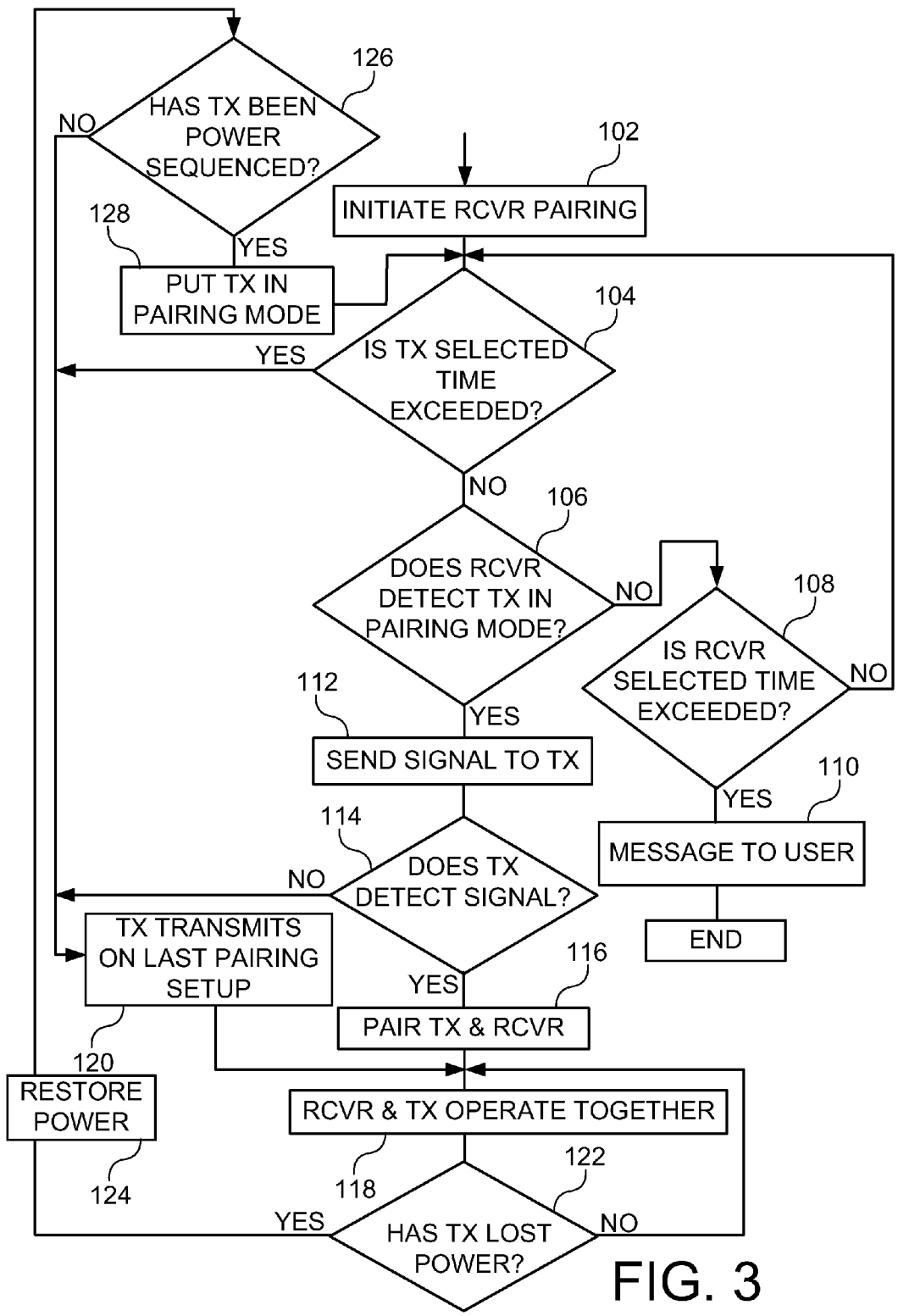
FIG. 3 is a flow chart illustrating an embodiment of the method used by the vehicles of FIGS. 1 and 2.
Figure 4:
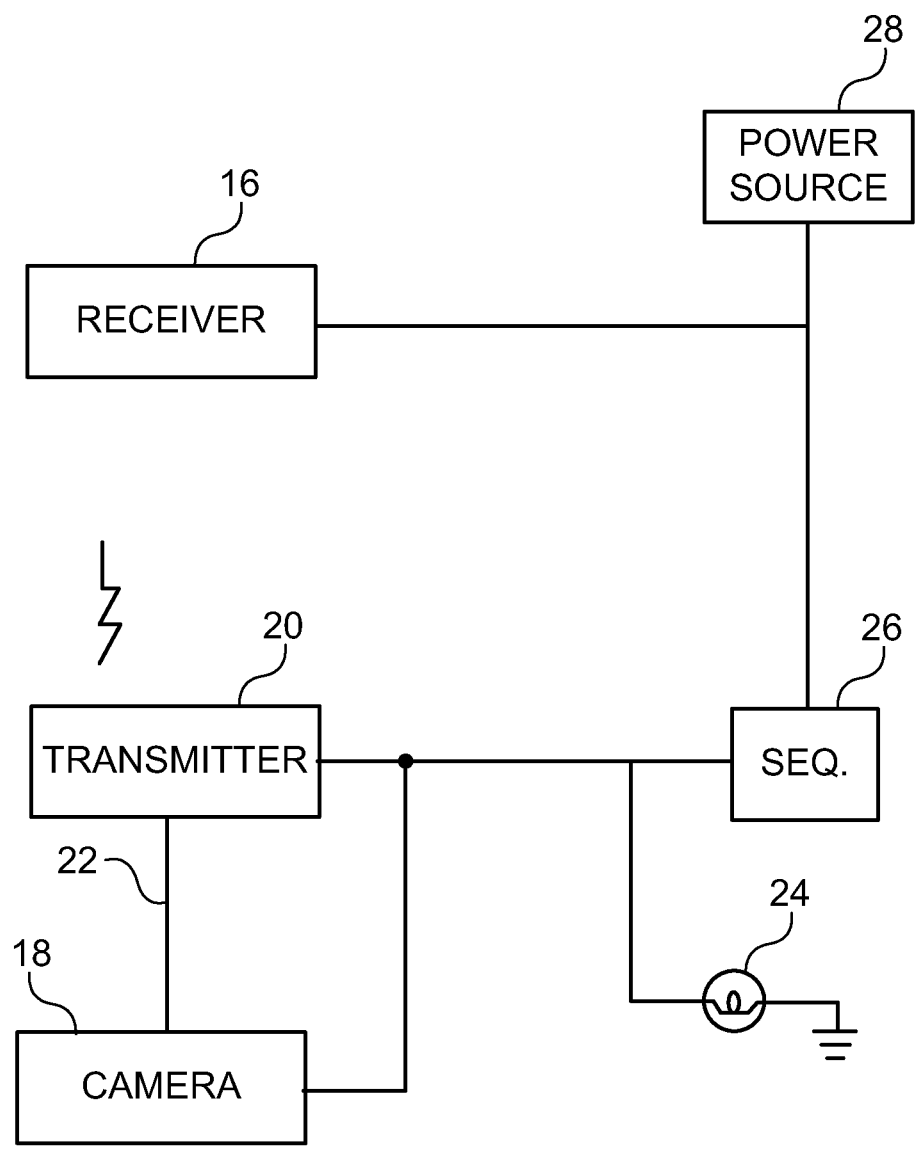
FIG. 4 is a schematic representation of the elements used in the apparatus that carries out the method of FIG. 3.

Now, additionally referring to FIGS. 3 and 4, there is respectively shown a method 100 illustrating the method of auto-pairing transmitter 20 to receiver 16, and a schematical view of inter connections of the auto-pairing devices. In FIG. 4 there is additionally illustrated lights 24, power sequencer 26 and a power source 28. Power source 28 supplies a typical vehicular direct current voltage of say 12 volts (although other power regimes are also contemplated). Electrical power may be switched on to receiver 16, by way of a switch (not shown) such as the ignition switch of truck 12. Power source 28 is also connected to power sequencer 26, which in turn passes electrical power to trailer lights 24, camera 18 and transmitter 20. The inclusion of trailer lights 24 in this example is to illustrate how the present invention can be integrated into the wiring of a trailer, with minimal intrusion to thereby allow easy retrofit of current trailer inventory. It is also contemplated that the wiring to camera 18 and transmitter 20 could be dedicated to those items and not include lights 24.

The function of power sequencer 26 may be carried out by the light switch 26 contained in truck 12 for turning on the lights to trailer 14. The inclusion of the element called the power sequencer 26 is to illustrate how a light switch 26 can be used to carry out a particular function. Alternatively, power sequencer 26 can be a separate device that is used as discussed hereinafter. Also, as discussed above, electrical power may be conveyed to camera 18 by way of link 22 making the connecting line from camera 18 to the power line unnecessary. Again transmitter 20 and camera 18 may be integral with each other. The lighting bolt line is to signify that receiver 16 and transmitter 20 communicate in a wireless fashion, conveying control information as well as audio and visual information therebetween.

In auto-pairing method 100 there are numerous steps that will be discussed to illustrate how the present invention functions to carry out the pairing of receiver 16 to transmitter 20. In FIG. 3, RCVR is used as an abbreviation of receiver 16 and TX is used as an abbreviation of transmitter 20. At step 102, an operator puts receiver 16 into a pairing mode, this means that receiver 16 is searching for a pairing signal from a transmitter, which for purposes of illustration is transmitter 20. Step 104 is inserted into the flow to determine how long transmitter 20 has been sending a pairing signal; this is obviously carried out within transmitter 20. The mixture of elements in method 100 that separately happen in receiver 16 and transmitter 20 is for the purpose of clarity to show overall how the actions of receiver 16 and transmitter 20 are choreographed together.

If, at step 104, transmitter 20 has been sending a signal to indicate that it is in a pairing mode for more than a selected predetermined time, such as two minutes, then method 100 stops transmitter 20 from sending the pairing signal and moves the method to step 120, discussed later. If, at step 106, receiver 16 detects a signal from transmitter 20 indicating that transmitter 20 is in a pairing mode, then receiver 16 sends a signal to transmitter 20 at step 112. If receiver 16 does not detect a paring signal from transmitter 20, at step 106, and receiver 16 has been looking for the pairing signal more than a selected predetermined time (step 108), such as 1 minute, then a message is sent to the operator at step 110. Alternatively, or in addition to the message, receiver 16 may attempt to receive a signal based on the last successful pairing with transmitter 20, which then would cause method 100 to proceed to step 118.

After sending a signal to transmitter 20, at step 112, then it is a question as to whether transmitter 114 receives the signal, if transmitter 20 does receive the signal then receiver 16 and transmitter 20 are paired at step 116. This means that receiver 16 and transmitter 20 are thereby locked into a pairing setup that defines how receiver 16 and transmitter 20 will operate together to ensure continued exclusive communication, as reflected at step 118. If method 100 arrives at step 120, for the various reasons shown including the failure of transmitter 20 to detect the signal from receiver 16, then transmitter 20 transmits the audio and/or visual information from camera 18 to receiver 16 based on the last successful pairing of receiver 16 to transmitter 20. The information sent to receiver 16 from transmitter 20 thereby provides the information displayed on receiver monitor 16 for the operator to see/hear what is happening behind trailer 14.

If at step 122, transmitter 20 has lost electrical power then method 100 proceeds to step 124 where, for purposes of understanding method 100, electrical power is restored to transmitter 20. Further details are not illustrated in FIG. 3, for the purposes of clarity, for example, it is a habit of some truck drivers to sometimes flash lights 24, perhaps as a courtesy gesture. To understand method 100, the question as to whether transmitter 20 has lost power, at step 122, can actually be construed to mean has transmitter 20 lost power for an extended period of time, say for more than 30 seconds. This allows momentary losses of power to be ignored. The ability of transmitter 20 and camera 18 to do this may be as a result of a small amount of energy storage therein to bridge such power losses. Alternatively, transmitter 20 may go into a low power state when power is lost and transmitter 20 may then shut down after the 30 second time period (other time periods are also contemplated).

If transmitter 20 has indeed lost power at step 122 for this extended period of time, which is indicative of vehicle system 10 shutting down, or the decoupling of trailer 14 from truck 12, then when power is restored at step 124, method 100 proceeds to step 126, where it is determined if electrical power has been sequenced to transmitter 20 by power sequencer 26. As mentioned above, power sequencer 26 is a way to discuss how to place transmitter 20 into a pairing mode. The powering sequence of transmitter 20 may simply be the restoration of electrical power at step 124, in which case lights 24 have been turned on by the operator, and hence electrical power has now been provided to transmitter 20, which will put transmitter 20 into to a pairing mode at step 128. Also, electrical power sequencing that is considered at step 126, can be a sequence of turning power on, then off, then back on with the light switch within a short period of time, to thereby put transmitter 20 into the pairing mode. If this sequencing is not detected then method 100 will proceed to step 120 as discussed above.

Alternatively, it is also contemplated that the electrical power circuit that powers transmitter 20 may have a power sequencer device 26 that, when activated by the operator in the cab of truck 12, will cycle the electrical power to transmitter 20 in a predetermined manner to thereby place transmitter 20 into a pairing mode at step 128. The combination of steps 122 through 128 are to be understood to preclude or reduce the times that transmitter 20 may be falsely placed into a pairing mode. Arriving at step 120 allows a recovery of mutual functioning of receiver 16 and transmitter 20, if pairing was not initiated by the operator of receiver 16 (step 102).

Advantageously, the present invention allows an operator of a vehicle that is hooking up a towed trailer to easily pair a receiver monitor in the cab of the vehicle to a camera on the back of the trailer, without requiring the operator to initiate pairing by way of a direct contact with the transmitter. Another advantage is that the present invention can be easily wired into existing power wiring on a trailer.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A vehicle system, comprising:
   an operator portion of the vehicle system, said operator portion having a light switch;
   a transporting portion of the vehicle system being coupled with said operator portion, said transporting portion including a plurality of lights controlled by said light switch;
   a receiver mounted in said operator portion; and
   a transmitter mounted on said transporting portion, said receiver and said transmitter being configured to become communicatively coupled by way of an auto-pairing method having the steps of:
   initiating said transmitter into a pairing mode by turning said light switch on;
   searching for said transmitter to be in said pairing mode by said receiver;
   sending a signal to said transmitter that said transmitter is paired to said receiver upon said receiver finding said transmitter being in said pairing mode in said searching step;
   failing to receive said signal from said receiver;
   transmitting information by said transmitter based on a previously paired set up dependent upon said failing step failing to receive said signal; and
   waiting on said failing step until a predetermined amount of time has passed since said initiating step is executed.

2. The vehicle system of claim 1, wherein said auto-pairing method further includes the step of stopping said searching step after a predetermined time if said receiver does not find said transmitter in said pairing mode.

3. The vehicle system of claim 2, wherein said auto-pairing method further includes the step of sending a message to an operator that said receiver is not paired to said transmitter if said stopping step is executed by the method.

4. The vehicle system of claim 1, wherein said information being at least one of audio information and visual information received from a rearward direction of said transporting portion.

5. The vehicle system of claim 4, wherein said transporting portion is detachably connected to said operator portion.

6. The vehicle system of claim 1, wherein said transmitter is not in said pairing mode by way of a direct operator initiation.

7. A receiver/transmitter system for use with a vehicle having an operator portion and a transporting portion, comprising:
   a receiver mountable in said operator portion; and
   a transmitter mountable on said transporting portion, said receiver and said transmitter being configured to become communicatively coupled by way of an auto-pairing method having the steps of:
   initiating said transmitter in a pairing mode by way of an electrical power sequencing of said transmitter;
   searching for said transmitter to be in said pairing mode by said receiver;
   sending a signal to said transmitter that said transmitter is paired to said receiver upon said receiver finding said transmitter being in said pairing mode in said searching step;
   failing to receive said signal from said receiver;
   transmitting information by said transmitter based on a previously paired set up dependent upon said failing step failing to receive said signal; and
   delaying to execute said failing step until a predetermined amount of time has passed since said initiating step is executed.

8. The receiver/transmitter system of claim 7, wherein said auto-pairing method further includes the step of stopping said searching step after a predetermined time if said receiver does not find said transmitter in said pairing mode.

9. The receiver/transmitter system of claim 8, wherein said auto-pairing method further includes the step of sending a message to an operator that said receiver is not paired to said transmitter if said stopping step is executed by the method.

10. The receiver/transmitter system of claim 7, wherein said electrical power sequencing is the application of electrical power to said transmitter.

11. The receiver/transmitter system of claim 7, wherein said transmitter is not in said pairing mode by way of a direct operator initiation.

12. A method of auto-pairing a receiver/transmitter system for use with a vehicle having an operator portion and a transporting portion, the method comprising the steps of:
   initiating a transmitter into a pairing mode by way of an electrical powering sequencing of said transmitter;
   searching for said transmitter to be in said pairing mode by a receiver;
   sending a signal to said transmitter that said transmitter is paired to said receiver upon said receiver finding said transmitter being in said pairing mode in said searching step;
   failing to receive said signal from said receiver;
   transmitting information by said transmitter based on a previously paired set up dependent upon said failing step failing to receive said signal; and
   delaying to execute said failing step until a predetermined amount of time has passed since said initiating step is executed.

13. The method of claim 12, wherein said electrical powering sequencing is the application of electrical power to said transmitter.

* * * * *